(12) United States Patent
Schleicher et al.

(10) Patent No.: US 7,047,406 B2
(45) Date of Patent: May 16, 2006

(54) METHOD AND SYSTEM FOR PROVIDING A SECURE PEER-TO-PEER FILE DELIVERY NETWORK

(75) Inventors: Jörg Gregor Schleicher, San Franciso, CA (US); Christopher Allin Kitze, Incline Village, NV (US)

(73) Assignee: Qurlo Holdings, Inc., Raleigh, NC (US)

( * ) Notice: Subject to any disclaimer, the term of this patent is extended or adjusted under 35 U.S.C. 154(b) by 717 days.

(21) Appl. No.: 09/814,319

(22) Filed: Mar. 21, 2001

(65) Prior Publication Data

US 2002/0138744 A1   Sep. 26, 2002

(51) Int. Cl.
*H04L 9/00* (2006.01)
(52) U.S. Cl. .................. 713/168; 713/170; 713/175; 713/176
(58) Field of Classification Search .............. 713/200, 713/201, 170, 176, 187, 180, 181; 705/51
See application file for complete search history.

(56) References Cited

U.S. PATENT DOCUMENTS

| | | | | |
|---|---|---|---|---|
| 5,978,791 | A * | 11/1999 | Farber et al. | 707/2 |
| 6,366,907 | B1 * | 4/2002 | Fanning et al. | 707/3 |
| 6,415,280 | B1 * | 7/2002 | Farber et al. | 707/2 |
| 6,742,023 | B1 * | 5/2004 | Fanning et al. | 709/219 |
| 6,751,666 | B1 * | 6/2004 | Huang et al. | 709/226 |
| 2002/0038296 | A1 * | 3/2002 | Margolus et al. | 707/1 |
| 2002/0038348 | A1 * | 3/2002 | Malone et al. | 709/217 |
| 2002/0049760 | A1 * | 4/2002 | Scott et al. | 707/10 |
| 2002/0052885 | A1 * | 5/2002 | Levy | 707/200 |
| 2002/0062290 | A1 * | 5/2002 | Ricci | 705/59 |

(Continued)

OTHER PUBLICATIONS

Waldman et al. A robust, tamper-evident, censorship-reistant web publishing system, published in the proceedings of the 9th USENIX Security Symposium, Aug. 2000.*

(Continued)

*Primary Examiner*—Hosuk Song
*Assistant Examiner*—Beemnet W Dada

(57) ABSTRACT

A method and system for electronically delivering files over a public network is disclosed. The network includes a plurality of computers including at least one server node and multiple client nodes. In a first aspect of the present invention, the method and system enable secure and reliable peer-to-peer file sharing between two client nodes. First, a digital fingerprint is generated and associated with a file in response to the file being selected for publication on a first client node. An entry for the file is then added to a searchable index of shared files on the server node, and the fingerprint for the file is also stored on the server. In response to a second client selecting the file from the search list on the server node, the file is automatically transferred from the first client node directly to the second client node. The second client node then generates a new fingerprint for the file and compares with the new fingerprint with the fingerprint from the server node, thereby verifying the authenticity of the file and publisher. In a second aspect of the present invention, the method and system also enable subscription-based decentralized file downloads to the client nodes. First, the client nodes are allowed to subscribe with the server node to periodically receive copies of one of the files. To provide a current subscribing client node with the file, the geographically closest client node containing the file is located, and the file is transferred from the closest node directly to the current subscribing node, thereby efficiently utilizing bandwidth.

22 Claims, 7 Drawing Sheets

U.S. PATENT DOCUMENTS

2002/0066026 A1* 5/2002 Yau et al. .................. 713/201
2002/0078461 A1* 6/2002 Boykin ....................... 725/87
2004/0143745 A1* 7/2004 Margolus et al. ........... 713/176

OTHER PUBLICATIONS

Clarke et al. Freenet: A Distributed Anonymous Information Storage and Retrieval System, 2000.*

*Website of AKAMAI: "Services" section*; 1999-2000 Akamai Technologies, Inc.; http://www.akamai.com/html/en/sv/services_index.html.

*Website of VERISIGN, INC.: "Consulting" section*; 2001 VeriSign, Inc.; http://www.verisign.com/consulting/index.html.

* cited by examiner

METHOD AND SYSTEM FOR PROVIDING A SECURE PEER-TO-PEER FILE DELIVERY NETWORK

CROSS-REFERENCE TO RELATED APPLICATIONS

This application is related to U.S. Provisional Patent Application No. 09/963,812, entitled "Method And System For Generating Revenue In A Peer-To-Peer File Delivery Network" (2060P), filed on the same date as the present application.

FIELD OF THE INVENTION

The present invention relates to peer-to-peer networks, and more particularly to a method and system for providing a secure peer-to-peer file delivery network.

BACKGROUND OF THE INVENTION

The Internet may be viewed as containing distributed information and centralized information. The distributed information is located throughout the Internet and typically takes the form of domain name servers and IP addresses, for instance. The centralized information is content, such as web pages and files, which is stored on and served by central servers.

Gaining access to such centralized content, however, is becoming increasingly difficult due to growing Internet congestion, limited bandwidth, and increasing file sizes (especially for media rich content). Traditional Internet technologies for distributing content, such as e-mail, streaming media, and FTP, have proven inadequate. E-mail is inadequate because due to the number of email messages and attachments passing through email servers, restrictions are placed on the sizes of emails that restricts what can be sent as attachments. E-mail also has security issues. PGP encryption is available for securing e-mails, but is not widely adopted.

Streaming media has the disadvantages of not working with all file types and is expensive because providers must purchase different software for the various streaming media standards. Streaming media also has not proven to be a reliable transfer method. And FTP file transfers also has disadvantages, which include being technically challenging to most users, and suffering from inefficient file transfers. There are other solutions for distributing content, but they are usually proprietary and do not scale well.

Another problem with distributing centralized content is cost. As file sizes increase, the distribution of content is becoming increasingly expensive for content providers due to metered pricing of used bandwidth. In metered pricing, a content provider's Internet-Service-Provider (ISP) monitors the output of the servers used to provide the content, and charges the content provider 95% of the peak usage even though the average output is much lower. Thus, the cost of distributing content from central servers is one reason why attempts have been made to decentralize content.

One way to decentralize content is through peer-to-peer networks. Peer-to-peer network computing is a more efficient means for distributing resources and content over the Internet. In a peer-to-peer network, all workstations and computers in the network may act as servers to all other users on the network. Some peer applications gain efficiencies by aggregating the distributed storage capacity of the computers across the network, such as Napster™ and Gnutella™, or aggregating the idle computing cycles of the computers, such as SETI@home™. Still others, such as instant messaging, take advantage of the direct network connections that peer devices can make to enhance communications.

Although peer networks are effective, current peer networks have disadvantages. One disadvantage is that a computer cannot serve a file unless that computer is logged into the network. Therefore, if the network includes a large number of home users who rarely turn on their computers, the number of files available for sharing on the network at any given time may be limited. Further, should the computer be logged-off during a file transfer to another computer, the receiving computer will not receive the entire file and the attempted file download will fail. There are other problems with conventional peer networks as well; such as users must manually initiate file transfers, and the networks have negligible security features.

In addition, most P2P efforts today are focused on private networks due to copyright liability concerns. For example, Napster has been held liable for the exchange of copyrighted information on its network. Companies are now trying to distance themselves from public networks, because there are currently no established standards between P2P network providers and the copyright holders. This means that information shared on private P2P networks is not available for a broad anonymous mass, but for a self selected pair or group of people who consciously choose to do so. Instead of attempting to propose solutions to the enforcement of copyrights on public P2P networks, most companies are turning inward towards private P2P networks.

Accordingly, what is needed is a public peer network for securely and reliably delivering files. The network should be reliably and secure enough to support delivery of content on a fee and non-fee basis, the network should reduce transfer costs, and allow for the policing and enforcements of copyrights. The present invention addresses such needs.

SUMMARY OF THE INVENTION

The present invention provides a method and system for electronically delivering files over a public network. The network includes a plurality of computers including at least one server node and multiple client nodes. In a first aspect of the present invention, the method and system enable secure and reliable peer-to-peer file sharing between two client nodes. First, a digital fingerprint is generated and associated with a file in response to the file being selected for publication on a first client node. An entry for the file is then added to a searchable index of shared files on the server node, and the fingerprint for the file is also stored on the server. In response to a second client selecting the file from the search list on the server node, the file is automatically transferred from the first client node directly to the second client node. The second client node then generates a new fingerprint for the file and compares the new fingerprint with the fingerprint from the server node, thereby verifying the authenticity of the file and publisher.

In a second aspect of the present invention, the method and system enables subscription-based decentralized file downloads to the client nodes. First, the client nodes are allowed to subscribe with the server node to periodically receive copies of one of the files. To provide a current subscribing client node with the file, the geographically closest client node containing the file is located, and the file is transferred from the closest node directly to the current subscribing node, thereby efficiently utilizing bandwidth.

DETAILED DESCRIPTION

The present invention relates to peer-to-peer networks, and more particularly to a method and system for providing a secure peer-to-peer file delivery network. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

The present invention provides a secure e-delivery network for large files, both commercial and private. The network enables secure and reliable peer-to-peer file sharing between client nodes where users may share content using both 1-to-1 and 1-to-many file transfers without the need for going through a server. The method for transferring files is secure, works through firewalls, tolerates network outages, and enforces copyrights. The network also enables subscription-based decentralized file downloads to the client nodes, where users may schedule delivery of content over the network on a fee and non-fee basis.

Figure 1A:
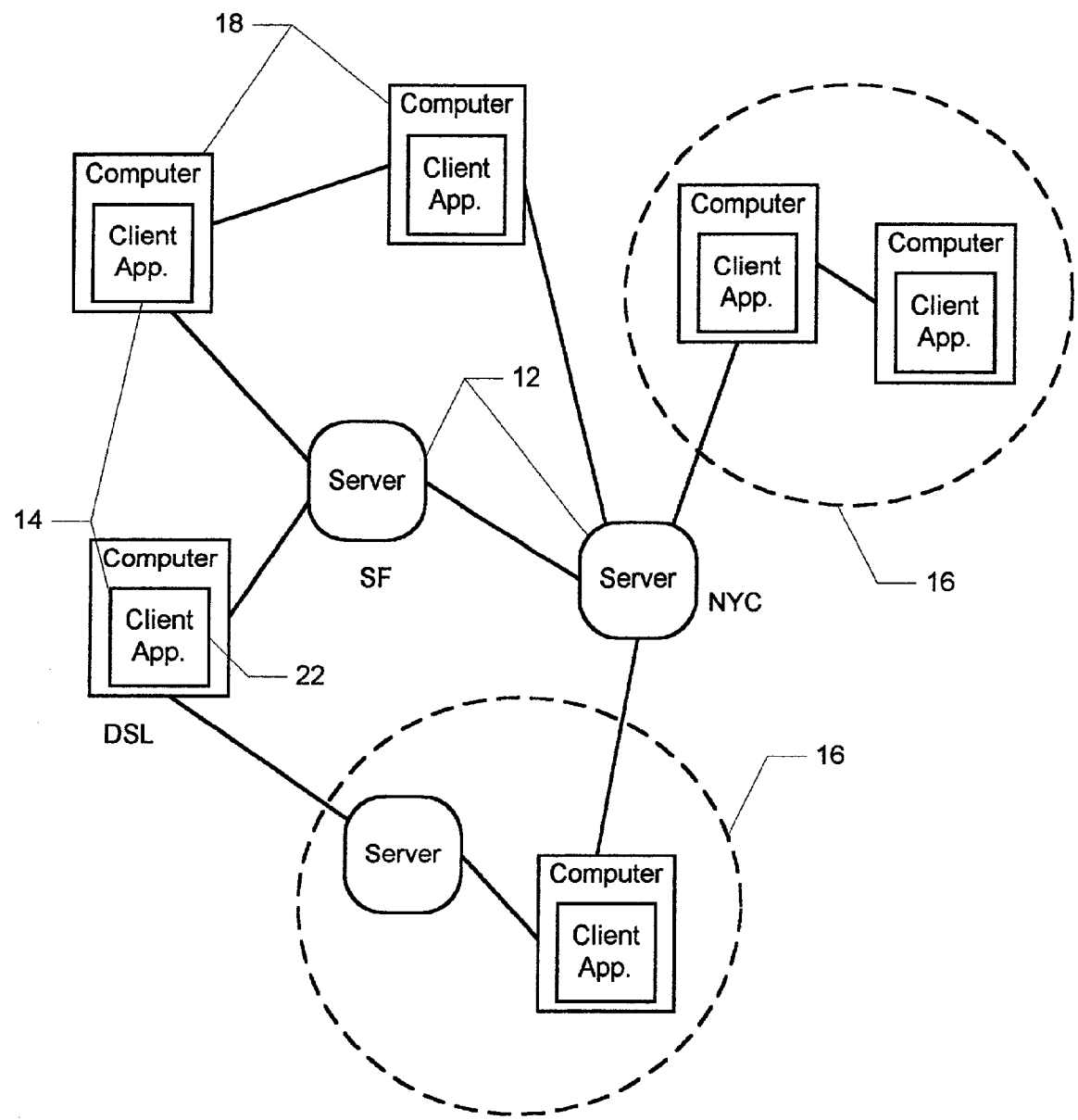
FIGS. 1A and 1B are block diagrams illustrating a peer-to-peer (P2P) network architecture.
Figure 1B:
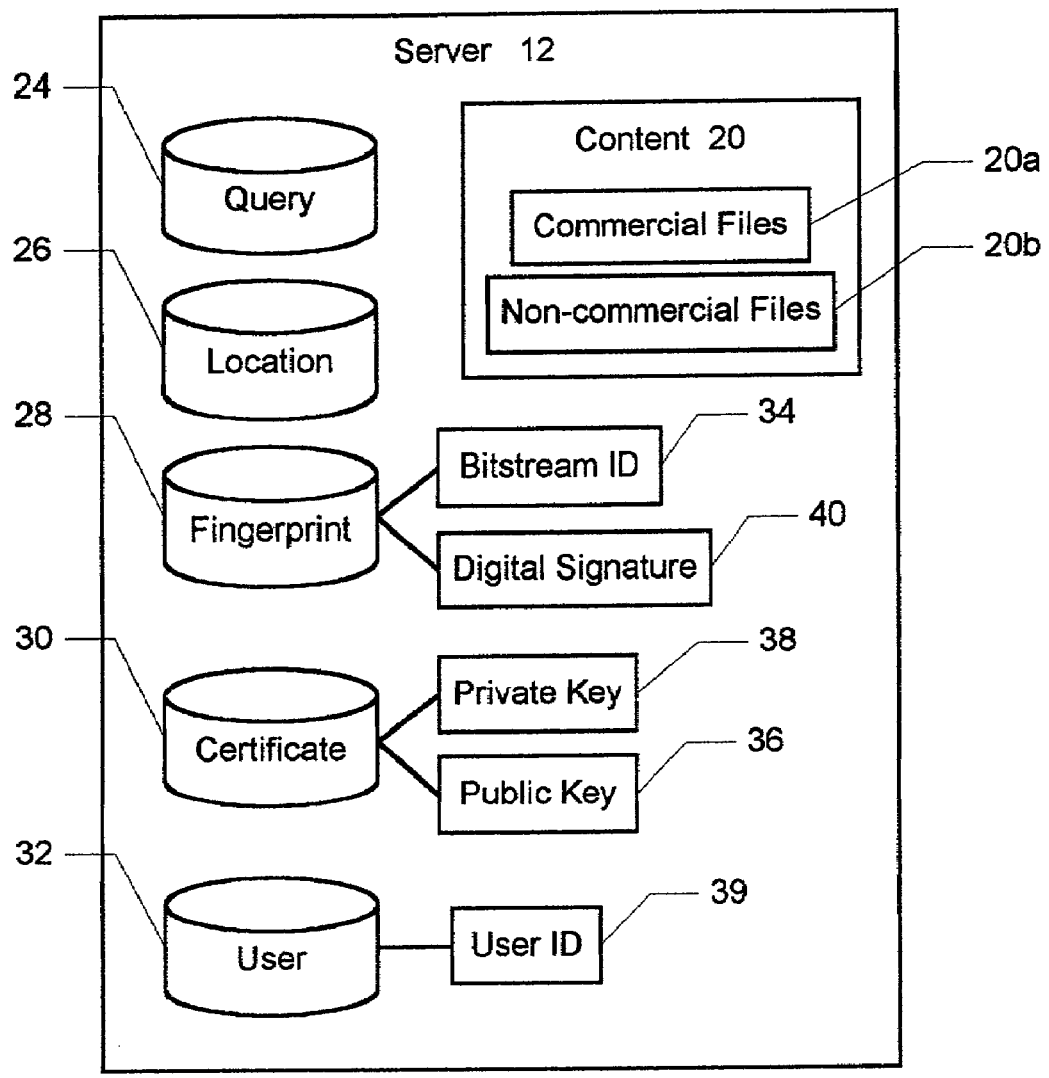
Figure 2A:
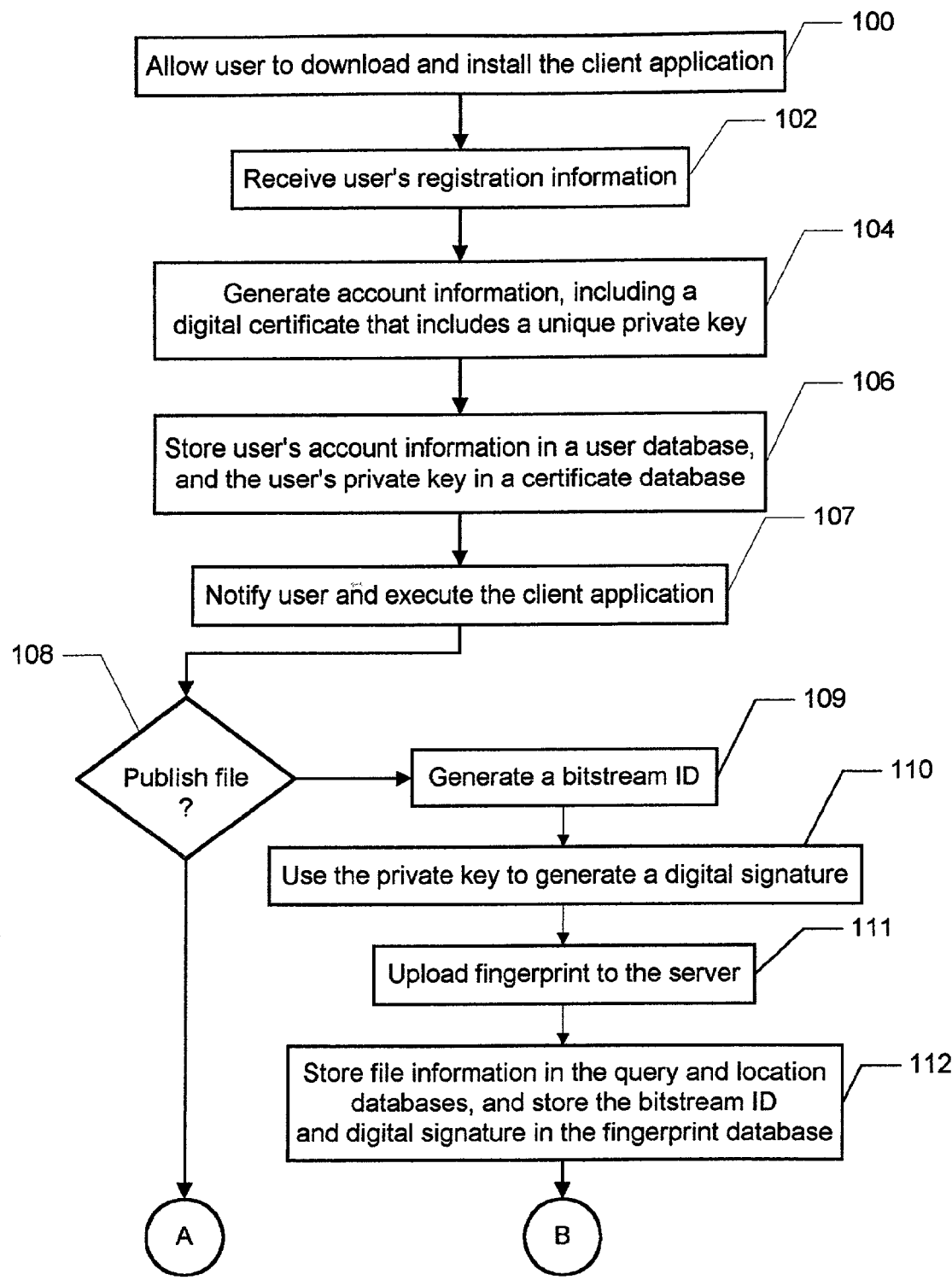
FIGS. 2A–2D are flow charts illustrating the process for providing secure and reliable file sharing in a peer-to-peer network.
Figure 2B:
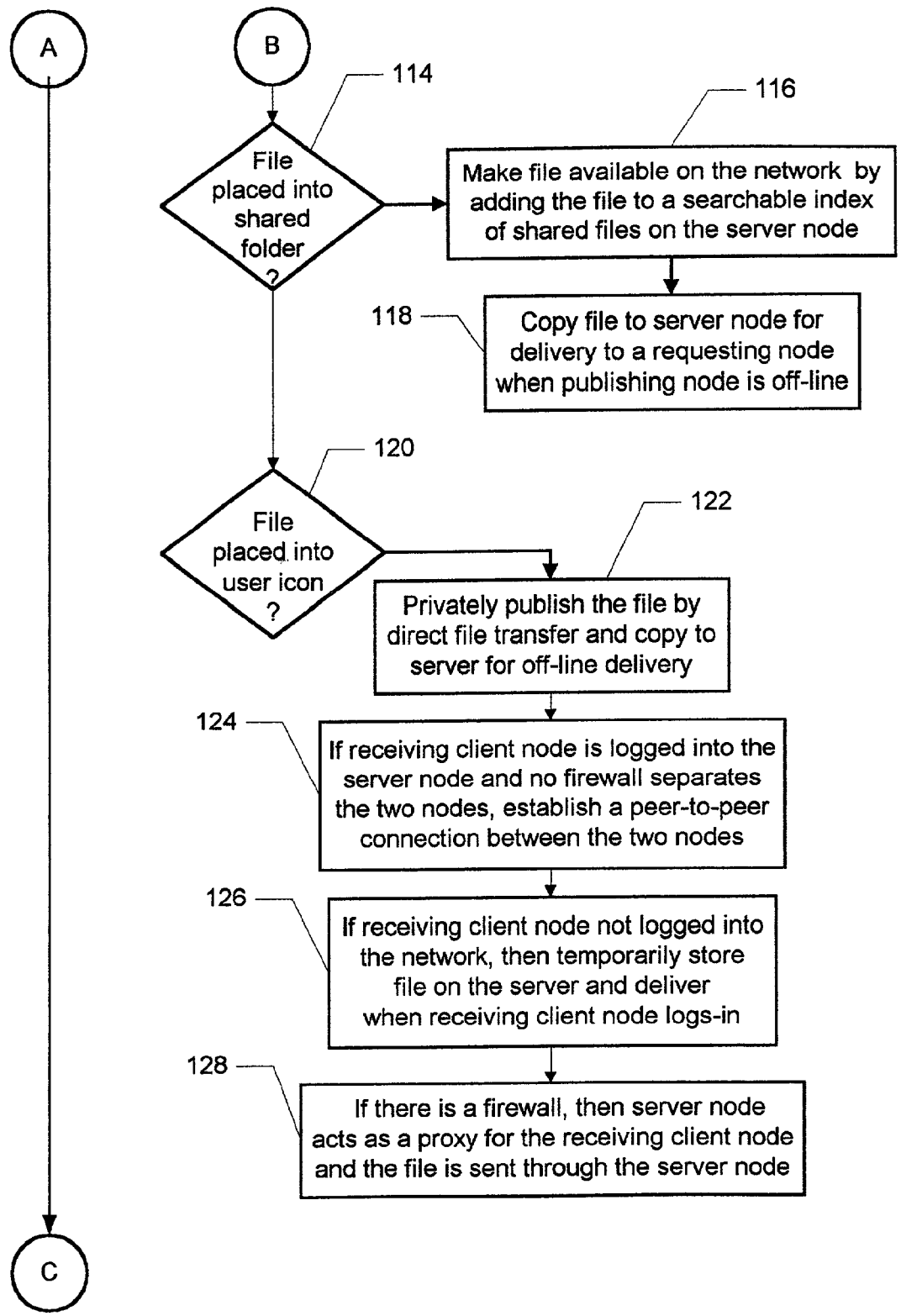
Figure 2C:
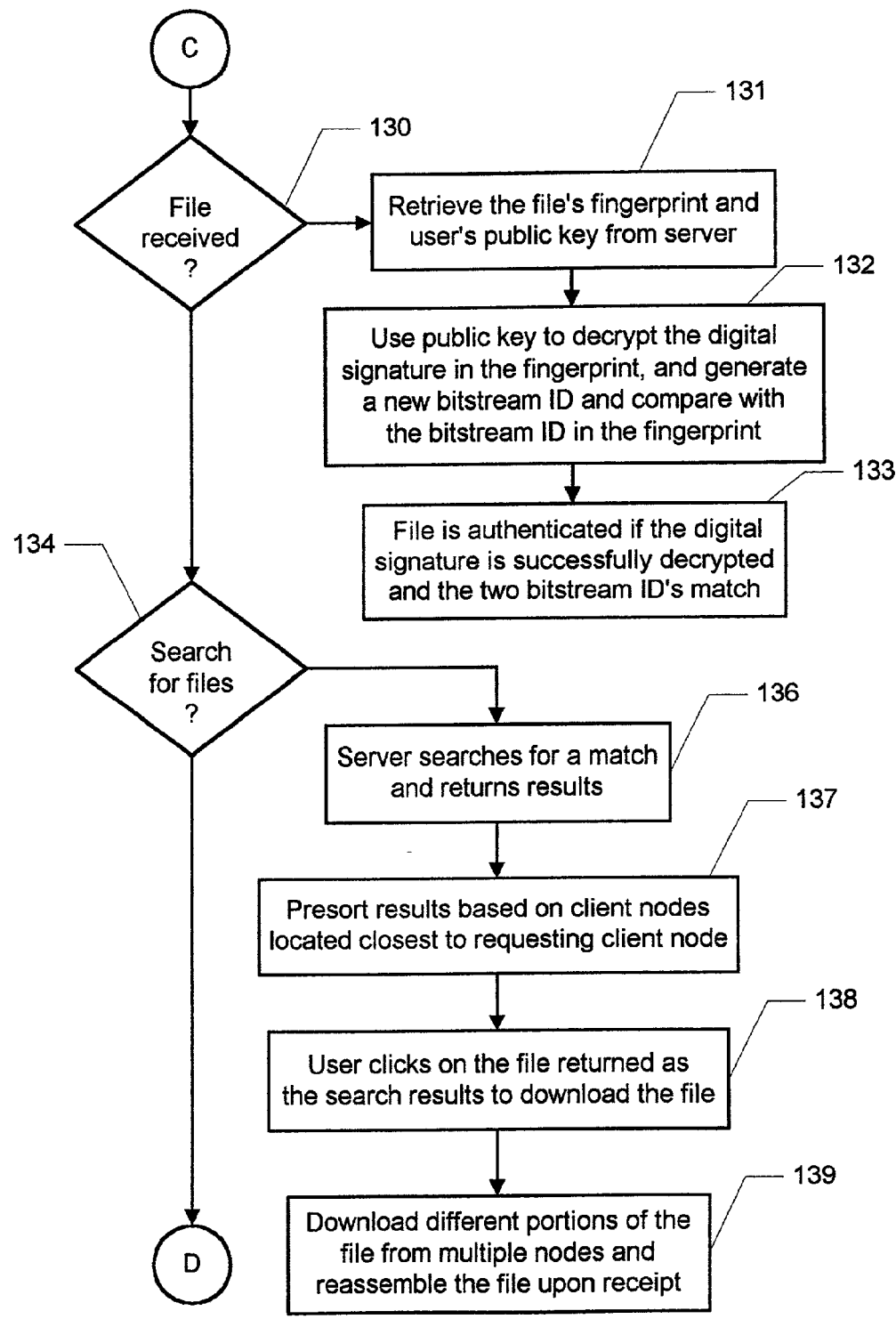
Figure 2D:
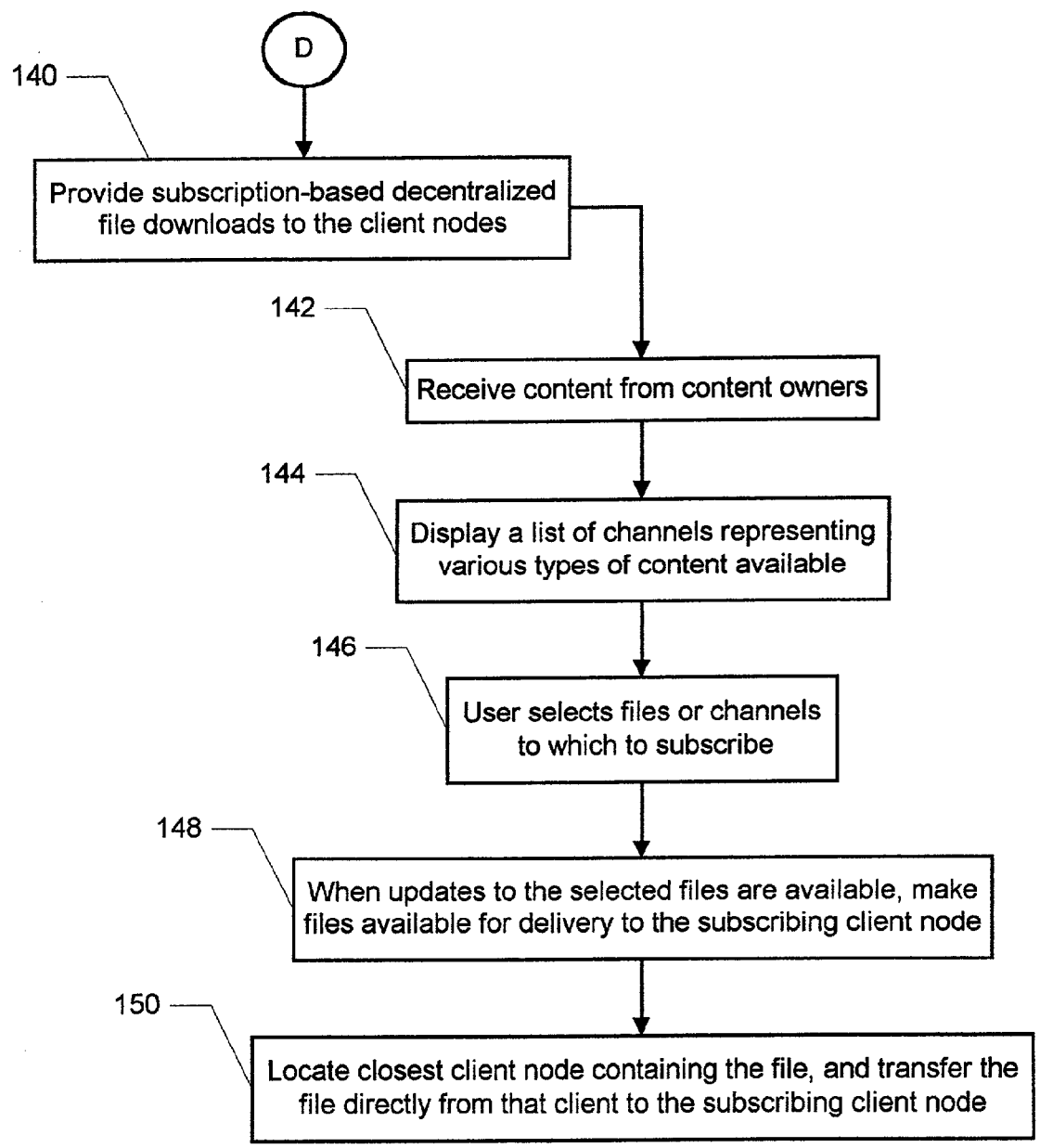

FIGS. 1A and 1B are block diagrams illustrating a peer-to-peer (P2P) network architecture in accordance with one preferred embodiment of the present invention. The peer-to-peer network 10 includes a plurality of computers 18 interconnected over a public network, such as Internet, where some of the computers 18 are configured as server nodes 12, and other computers 18 are configured as client nodes 14. A client node 14 may represent a single computer or a proprietary network, such as AOL, or a cable network, for example, and in a preferred embodiment, the server nodes 14 are located worldwide.

Any combination of server nodes 12 and client nodes 14 may form extranets 16 that are protected by firewalls (not shown). As is well known in the art, an extranet 16 is basically a private network that uses the public Internet as its transmission system, but requires passwords to gain entrance.

The primary purpose of the peer-to-peer network 10 is the propagation of content over the network 10. FIG. 1B is a diagram illustrating contents of the server nodes 12. A server node 12 as used herein may refer to any computer that combines hosting services with databases. In a preferred embodiment, each server node 12 stores content 20 that comprises both commercial files 20a and noncommercial files 20b. Both a publisher of the content 20 and a recipient of the content 20 have a vested interest in secure and reliable delivery of the content 20. Example type of content files may include audio files, video files, news articles and online magazines, image files, and confidential documents, for instance.

A computer 18 becomes a client node 14 by installing and running a P2P client application 22 designed for public networks that operates as described herein. In operation, the client application 22 allows the client node 14 to authenticate other client nodes 14 and to both receive content 20 and serve content 20.

According to the present invention, the server nodes facilitate the file sharing process by performing a combination of the following functions. A first function of the server nodes is to process search requests from the client nodes for files and to provide the results. A second function of the server nodes is to aid the client nodes in authenticating other client nodes and file transfers during direct client-node transfers. A third function is content delivery, which includes a) providing subscription-based decentralized file downloads that allow the client nodes to subscribe and automatically receive periodically updated files (push technology), and b) storing files when a client node publishes a file for subsequent delivery to a requester by the server when the publishing node is off-line. A fourth function of the server nodes (and the client nodes) is to serve as proxies to the extranets so that the client nodes inside the extranets can be part of the peer-to-peer network through the extranet firewalls.

As shown in FIG. 1B, in a preferred embodiment of the present invention, each server node 12 includes several databases for implementing the functions described above. The server node 12 includes a query database 24, a location database 26, a fingerprint database 28, a certificate database 30, and a user database 32. The query and a location databases 24 and 26 store the names and locations of the files shared on the network, respectively. The fingerprint database 28 stores fingerprint information that has been generated for each file for determining the authenticity of the files. The certificate database 30 contains certificate information to certify and verify the authenticity of all users of the file network 10. And the user database 32 includes account information for the users of the client nodes 14.

FIGS. 2A–2D are flow charts illustrating the process for providing secure and reliable file sharing in a peer-to-peer network in accordance with a preferred embodiment of the present invention. The process begins by allowing a user to become a member of the network 10 by downloading and installing a copy of the P2P client application 22 on the user's computer in step 100. In a preferred embodiment, the P2P client application 22 is downloaded from one of the server nodes 12, although the P2P client application 22 may be obtained from other sources.

Next, the server node 12 receives registration information entered by the user in step 102, which can include demographic information, billing information, and e-mail address. In response, the server node 12 generates account information for the user, including a digital certificate that includes a public key 36 and a private key 38 in step 104. The user's account information, such as the user ID 39, is stored in the user database 32, and the user's public key 36 and private key 38 are stored in the certificate database 30 in step 106. When registration is complete, the user is notified and may then execute the P2P client application 22 in step 107. When the client node 12 invokes the client application 22, a client application desktop window is displayed on the computer 18.

Figure 3:
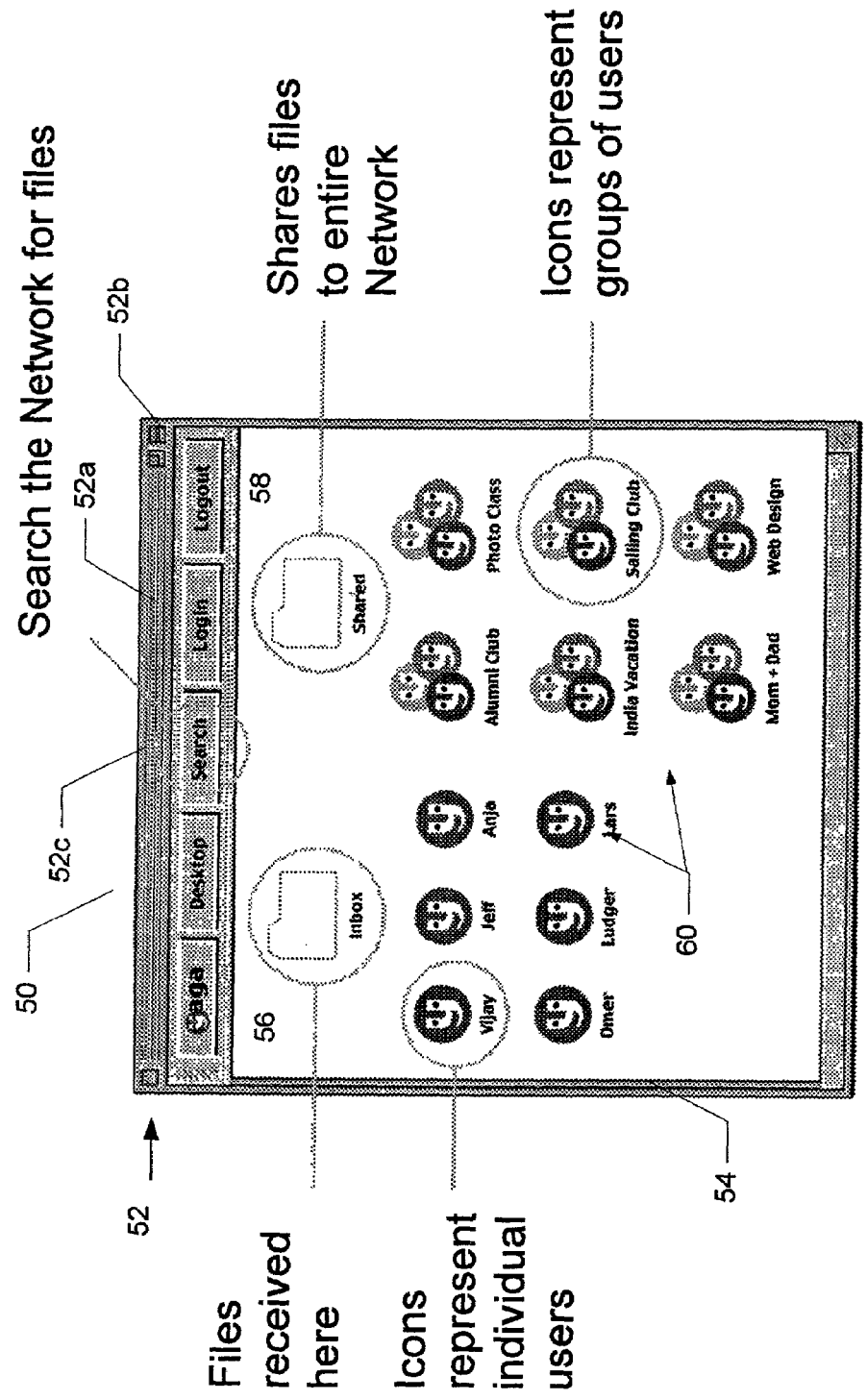
FIG. 3 is a block diagram illustrating a preferred embodiment of the client application desktop window.

Referring now to FIG. 3, a block diagram is shown illustrating a preferred embodiment of the client application desktop window. The client application desktop window 50 may include a row of command buttons 52, and an area 54 for displaying folders and icons. The user logs in and out of the network 10 via command buttons 52a and 52b, and may search for files on the network via the search button 52c. An inbox folder to 56 contains files and notifications that are received from the network 10, and a shared folder 58 contains files that the user wishes to publish over the network 10 for access by other client nodes 14. User icons 60 represent individual users and groups of users to which the user wants to exchange files with on a peer-to-peer basis.

Referring to both FIGS. 2A, 2C–2D and 3, the P2P client application 22 allows the user to perform four primary functions: publish and share files over the network in step 108, receive files over the network in step 130, search for files to download in step 134, and subscribe to content over the network in step 140.

The user may publish files over the network 10 in step 108 either publicly or privately. In accordance with the present invention, secure file transfers are enabled by creating a fingerprint for each file when the file is published via steps 109–112. Referring to both FIGS. 1B and 2A, first, the P2P client application 22 generates a bitstream ID 34 for the file in step 109. In a preferred embodiment, the bitstream ID 34 is generated by calculating binary values in data blocks of the file itself. The P2P client application 22 then uses the private key 38 to generate a digital signature 40 for the file in step 110. In an alternative embodiment, the private key 38 may also be used to encrypt the bitstream ID. Together, the bitstream ID 34, the file information, and the digital signature 40 form the fingerprint for the file. The fingerprint ensures that the file is transmitted in its original state (data integrity) by the identified user/publisher.

After the fingerprint is generated, the fingerprint is uploaded to the server node 12 in step 111. The file information is stored in the query and location databases 24 and 26, and the bitstream ID 34 and digital signature 40 are stored in the fingerprint database 28 under an entry for the file in step 112. Preferably, the name of the file is stored in the query database 22, while attributes of the file, such as the identity of the user/publisher and the publishing node, the file size, the bit rate of the file, and so on, are stored in the location database 26. After the file fingerprint has been uploaded, the file is ready for transmission over the network 10.

If the user places the file into the shared folder 58 in step 114, then the file is made publicly available on the network for searching by other client nodes 14 by adding the file to a searchable index of shared files on the server node in step 116.

The file is also made publicly available on the network for downloading by other client nodes 14 in step 118 by transferring a copy of the file from the publishing node to the server node 12. Should the publishing node be off-line when another node requests the file, the file may then be served by the server node 12, further enhancing the reliability of the network 10.

If the user places the file onto one of the user icons 60 in step 120, then the file is privately sent by direct file transfer and also copied to the server node for off-line delivery in step 122. If the receiving client node(s) are logged into the server node and there are no firewalls nodes in step 124, then a peer-to-peer connection is established between the two nodes and the file is sent directly to the receiving node without first going through the server node.

If the receiving client node(s) are not logged into the network, then the file may be temporarily stored on the server node and delivered by the server node when receiving client node 14 logs-in in step 126.

If a firewall separates the publishing client node 14 from the receiving client node, then the server node 12 acts as a proxy for the receiving client node 14 and the file is sent through the server node 12 in step 128. In a preferred embodiment, any node in the network may serve as a proxy for a firewall-protected node, as described in U.S. patent application Ser. No. 09/773,314, entitled Facilitating File Access From Firewall-Protected Client Nodes In A Peer-To-Peer Network, filed on Jan. 31, 2001, and hereby incorporated by reference.

A file is received by a client node 14 in step 130 when the file is deposited in the inbox 56, or after a user has requested a download after a successful search in step 134. The client application 22 begins the authentication process by retrieving the fingerprint associated with the file and the user's public key from the server node 12 in step 131. Alternatively, the public key may be retrieved from the sender.

The public key is used to decrypt the digital signature 40 in the fingerprint, and a new bitstream ID is generated and compared with the bitstream ID 34 in the fingerprint in step 132. If the digital signature is successfully decrypted and the two bitstream ID's match, then the file is authenticated in step 133. In the embodiment where the bitstream ID is encrypted, the encrypted bitstream ID in the fingerprint must be decrypted with the public key before the comparison.

Fingerprinting files as described herein allows the receiving node to determine the authenticity of both the file and the publisher. Thus, the network of the present invention provides a solution to the current copyright infringement problem occurring in public networks, especially in the music business, by keeping track of what files are published and by whom, which facilitates tracking down infringing users. In an alternative embodiment, another level of security may be added to the fingerprint authentication by encrypting the file with the user's private key upon publication. When the file is received and authenticated, the user's public key may be used to decrypt the file.

The user may also search for files published on the network by others in step 134 by clicking on the search button 52*c* and entering search terms. In response, the server node searches for a match for the search terms in the query database in step 136.

In conventional networks, the combination of a file name and the file data are unique. That is, even though data for different files may be the same, each of the files may have different file names. Therefore, a particular set of search terms entered by the user may result in the return of many different files, all with slightly different names. In the present invention, file names are separated from the file data. In response to search terms entered by the user, the query database 24 has the ability to associate various file names identifying the same file with one actual file, such that the redundancy in search results is decreased or eliminated.

In a further aspect of the present invention, instead of just displaying a list of matching file names, the server examines the entries for the files in the location database 26, presorts the matches based on the files that are located closest to the requesting client node, and returns the results in step 137. The criteria for determining the closest client nodes include geographic location, bandwidth speed, and current network traffic. In a preferred embodiment, the server node 12 may return a list of the highest-ranking files to the client node, but only displays the highest-ranking file name to the user, rather than a list of redundant files. The user may then click on the file returned as the search result to have the file downloaded in step 138.

In conventional peer networks, if the file is downloaded from one node to another, and the first node logs-off during the transfer, then file delivery will fail. The present invention further ensures reliable delivery using multiple and partial file transfers. To download a file, the client node downloads different portions of the file from different thus nodes (e.g., downloading ⅓ of the file from three different nodes), and then reassembles the file upon receipt in step 139. If one node goes off-line, an alternate will be selected.

In accordance with a further aspect of the present invention, the e-delivery network 10 also provides subscription-based decentralized file downloads to the client nodes, in which a user subscribes to content 20 on the network 10 through the P2P client application 22 in step 140. The content 20 is received from content owners and authors who contract with the network 10 to deliver the content 20 to users in step 142. Examples of content owners and authors include movie studios, software publisher, game publishers, and record labels. In a preferred embodiment, the content owners are charged for delivery based on a priority of delivery they select and the quantity of files delivered.

In a preferred embodiment, the client application window 50 displays a "channels" folder (not shown) containing a list of channels representing various types of content available in step 144. Examples of channels include video channels, news channels, and software updates that are frequently updated and/or subject to new versions. The user may then select files or channels to which to subscribe to receive copies of the files in step 146. The files may include any combination of audio, video, text and graphics. Through the subscription feature of the present invention, users are provided with the ability to select future versions of content.

When updates to the selected files are available, the files are made available for delivery to the subscribing client node in step 148. In one preferred embodiment, the client node contacts the server node for a list of available files at predetermined time intervals, and then makes a download request for the files. In an alternative preferred embodiment, the server node automatically initiates the download.

According to the present invention, to deliver a particular file to a subscribing client node, the server node locates the closest client node containing the file, and the file is transferred directly from that client to the subscribing client node in step 150. As described above, the closest client node is determined using factors including geographic location, bandwidth speed, and current network traffic. Once the file has been downloaded to the subscribing client node, the file may then be hosted from that client node for other subscribing client nodes.

By serving copy of the files peer-to-peer, rather than from the server node, the present invention efficiently utilizes unused bandwidth of the client nodes. Thus, the present invention utilizes push technology to even out bandwidth distribution by transferring files during off-peak hours to take advantage of idle bandwidth of the client nodes. For a worldwide network, this means that at some point during the day, there is always idle network bandwidth available for delivering subscription files. Consequently, the present invention greatly reduces bandwidth cost for the network 10 since the files are served directly from client-to-client on a request basis, rather from the server node to all of the client nodes. These principles may also be employed when files are pushed from the server nodes 12.

The e-delivery network of the present invention also allows for the enforcements of copyrights on request. When a third party notifies the network 10 that a particular file is copyrighted and is being copied without permission on network, all references to the file are deleted from the query, location, fingerprint, and certificate databases. Without these references, the file will no longer be available for sharing on the network 10. In addition, original publishers of copyright infringing content can be tracked.

A method and system for providing a secure peer-to-peer file delivery network has been disclosed. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for electronically delivering files over a public network of computers comprising at least one server node and multiple client nodes, the method comprising:
   (a) enabling secure and reliable peer-to-peer file sharing between two client nodes by generating account information for a user, including a digital certificate, in response to a registration process, wherein the digital certificate includes a private key and a public key,
       (i) in response to a file being selected for publication on a first client node by the user, generating and associating a digital fingerprint with the file, generating a bitstream ID for the file and including the bitstream ID in the fingerprint, and using the user's private key to generate a digital signature from the file and including the digital signature in the fingerprint;
       (ii) adding an entry for the file to a searchable index of shared files on the server node and storing the fingerprint on the server;
       (iii) in response to a second client node selecting the file from the search list on the server node, automatically transferring the file from the first client node directly to the second client node; and
       (iv) authenticating the file by the second client node by generating a new bitstream ID, comparing the new bitstream ID to the bitstream ID in the fingerprint stored on the server, and using the user's public key to decrypt the digital signature to determine the authenticity of the file and publisher.

2. The method of claim 1 further including the step of:
   (b) enabling subscription-based decentralized file downloads to the client nodes by
       (i) allowing the client nodes to subscribe with the server node to periodically receive copies of one of the files,
       (ii) when providing a current subscribing client node with the file, locating the closest client node containing the file, and
       (iii) transferring the file from the closest node directly to the current subscribing node, thereby efficiently utilizing bandwidth.

3. The method of claim 1 wherein step (a)(ii) further includes the step of providing the server node with a database for storing the user's account information and the fingerprint for the file.

4. The method of claim 1 wherein step (a)(iii) further includes the step of transferring the file from the first client node directly to the second client node if both the first and second client nodes are logged-in to the network and no firewall separates the first and second client nodes.

5. The method of claim 4 wherein step (a)(iii) further includes the step of: if the second client node is not logged into the network, then temporarily storing the file on the server node, and delivering the file by the server node when second client node logs-in to the network.

6. The method of claim 5 wherein step (a)(iii) further includes the step of: if a firewall separates the first client node from the second client node, then using the server node to act as a proxy for the second client node and sending the file through the server node.

7. The method of claim 6 further including step (c) for allowing a user of the first client node to search for files on the network, and presorting results based on files found that are stored on client nodes located closest to the first client node.

8. The method of claim 7 wherein step (b)(iii) further includes the step of transferring the file during off-peak hours to take advantage of idle bandwidth of the subscribing node and thereby evening out bandwidth distribution of the network.

9. The method of claim 1 wherein step (a)(i) further includes the step of allowing a user of the first client node to privately publish the file or publicly publish the file.

10. The method of claim 1 wherein step (a)(ii) further includes transferring a copy of the file from the first node to the server node so that should the first node be off-line when another node request the file, the file may then be served by the server node.

11. The method of claim 1 wherein step (a)(iii) of transferring the file to the second client node further includes the step of transferring different portions of the file from different nodes and then reassembling the file upon receipt.

12. A peer-to-peer file delivery network, comprising:
at least one server node
multiple client nodes coupled to the server node over the network, each of the client nodes running a client application, wherein the client application works and operates in conjunction with the server node to enable secure and reliable peer-to-peer file sharing between two client nodes by,
    generating account information for a user of each client node, including a digital certificate, in response to a registration process, wherein the digital certificate includes a private key and a public key,
    in response to a file being selected for publication on a first client node by a first user,
        generating and associating a digital fingerprint with the file,
        generating a bitstream ID for the file and including the bitstream ID in the fingerprint, and
        using the user's private key to generate a digital signature from the file and including the digital signature in the fingerprint,
    adding an entry for the file to a search list of shared files on the server node and storing the fingerprint on the server,
    in response to a second client node selecting the file from the search list on the server node, automatically transferring the file from the first client node directly to the second client node, and
    authenticating the file by the second client node by generating a new bitstream ID, comparing the new bitstream ID to the bitstream ID in the fingerprint stored on the server, and using the user's public key to decrypt the digital signature to determine the authenticity and reliability of the file and publisher.

13. The network of claim 12 wherein the client application operates in conjunction with the server node to enable subscription-based decentralized file downloads to the client nodes by
    allowing the client nodes to subscribe with the server node to periodically receive copies of one of the files,
    when providing a current subscribing client node with the file, locating the closest client node containing the file, and
    transferring the file from the closest node directly to the current subscribing node, thereby efficiently utilizing bandwidth.

14. The network of claim 12 wherein the server node includes a database for storing the user's account information and the fingerprint for the file.

15. The network of claim 12 wherein the file is transferred from the first client node directly to the second client node if both the first and second client nodes are logged-in to the network and no firewall separates the first and second client nodes.

16. The network of claim 15 wherein if the second client node is not logged into the network, the file is temporarily stored on the server node and delivered the file by the server node when second client node logs-in to the network.

17. The network of claim 16 wherein if a firewall separates the first client node from the second client node, then the server node acts as a proxy for the second client node and sending the file through the server node.

18. The network of claim 17 wherein a user of the first client node may search for files on the network, and the results are presorted based on files found that are stored on client nodes located closest to the first client node.

19. The network of claim 18 wherein the file is transferred during off-peak hours to take advantage of idle bandwidth of the subscribing node and thereby evening out bandwidth distribution of the network.

20. The network of claim 12 wherein a user of the first client node may privately publish the file or publicly publish the file.

21. The network of claim 12 wherein a copy of the file is transferred from the first node to the server node so that should the first node be off-line when another node requests the file, the file may then be served by the server node.

22. The network of claim 12 wherein different portions of the file are transferred the second client from different client nodes and then reassembled the file upon receipt.

* * * * *